C. M. WHEELER.
MACHINE FOR FORMING AND CUTTING DOUGHNUTS AND OTHER CAKES.
APPLICATION FILED JULY 26, 1917.

1,328,025.

Patented Jan. 13, 1920.
4 SHEETS—SHEET 1.

Inventor,
Charles M. Wheeler,
By Frank S. Anderson,
Attorney

C. M. WHEELER.
MACHINE FOR FORMING AND CUTTING DOUGHNUTS AND OTHER CAKES.
APPLICATION FILED JULY 26, 1917.

1,328,025.

Patented Jan. 13, 1920.
4 SHEETS—SHEET 2.

Inventor,
Charles M. Wheeler,
By Franks Ahnemann,
Attorney

C. M. WHEELER.
MACHINE FOR FORMING AND CUTTING DOUGHNUTS AND OTHER CAKES.
APPLICATION FILED JULY 26, 1917.
1,328,025.
Patented Jan. 13, 1920.
4 SHEETS—SHEET 3.
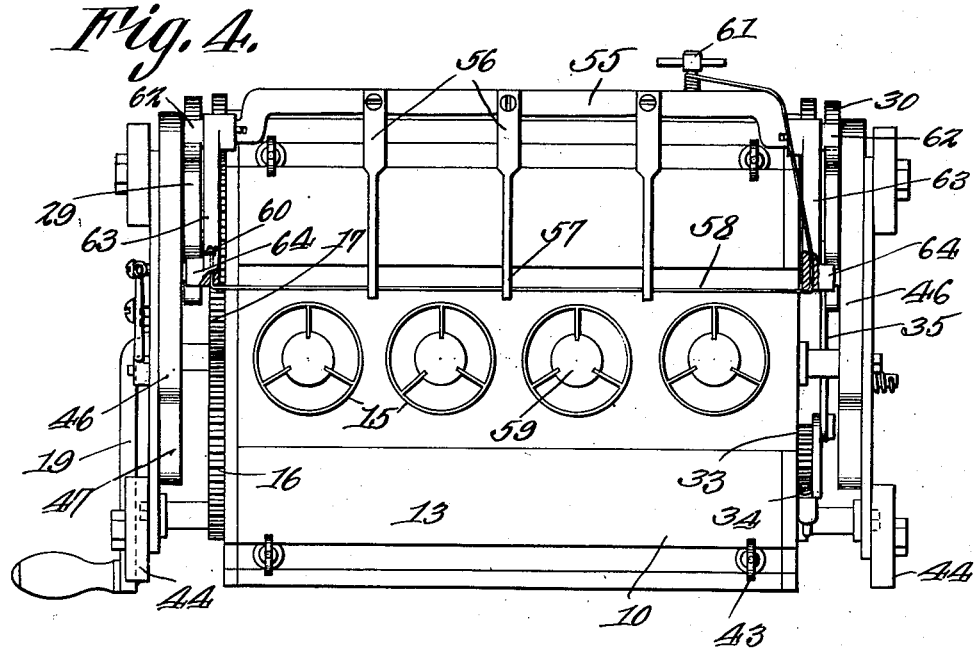
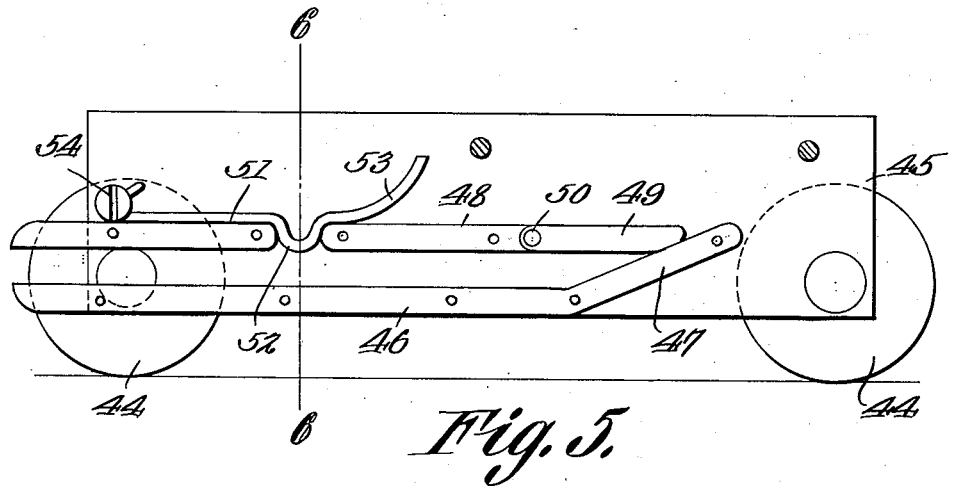
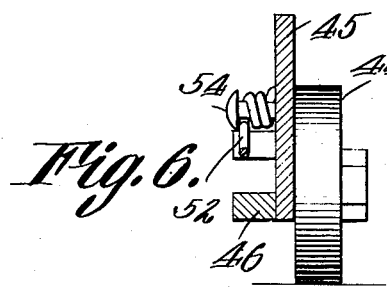
Inventor,
Charles M. Wheeler,
By Frank S. Anderman,
Attorney

UNITED STATES PATENT OFFICE.

CHARLES M. WHEELER, OF BELLINGHAM, WASHINGTON.

MACHINE FOR FORMING AND CUTTING DOUGHNUTS AND OTHER CAKES.

1,328,025.　　　　　Specification of Letters Patent.　　Patented Jan. 13, 1920.

Application filed July 26, 1917. Serial No. 182,932.

*To all whom it may concern:*

Be it known that I, CHARLES M. WHEELER, a citizen of the United States of America, and resident of Bellingham, in the county of Whatcom and State of Washington, have invented certain new and useful Improvements in Machines for Forming and Cutting Doughnuts and other Cakes, of which the following is a specification.

This invention relates to dough working machinery and particularly to means for forming and cutting doughnuts, the said invention having for its object the provision of novel means whereby the dough is forced to a former and whereby it is automatically cut into such appropriate sizes and configuration as to produce a doughnut.

Another object of this invention is to provide novel means whereby a cutting device operates in conjunction with the former and whereby the said cutting device is positively driven and moved in a vertical plane with relation to the molding device so that on moving in one direction, the cutter clears the advancing dough and on the return movement operates to sever or cut the dough that is advanced through the mold.

A further object of the invention is to provide means whereby a cutting frame is positively driven or reciprocated on the two ends of the frame so that it will move uniformly and in proper operative relation to the mold.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Fig. 4 illustrates an underneath plan view;

Fig. 5 illustrates an enlarged detail view of a guide of a cutter frame;

Fig. 6 illustrates a sectional view on the line 6—6 of Fig. 5;

Figure 1:
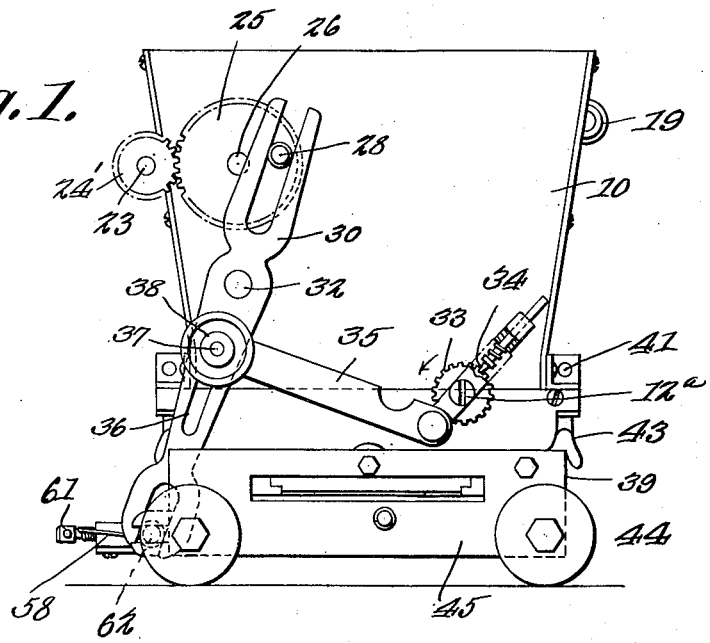
Figure 1 illustrates a view in elevation of one end of a doughnut cutter and former embodying the invention.

In these drawings 10 denotes a hopper, 11 and 12 the feed rollers mounted to rotate at the bottom 13 of the hopper, the said bottom being provided with apertures, the edges 14 of which are flanged to form seats for dies 15 through which the dough is expressed.

The rollers 11 and 12 have journals 11$^a$ and 12$^a$ respectively which rotate in journal bearings in the hopper and said journals of the rollers are geared together by means of the gear wheels 16 and 17 so that they may be rotated in unison and operate on the dough for the purpose indicated.

A gear wheel 18 is carried by a crank handle 19 and journaled in the end of the hopper, and the gear wheel 18 meshes with the gear wheel 20 journaled on a stud 21 which extends from the end of the hopper, and said gear wheel 20 meshes with a gear wheel 22 mounted on a shaft 23 journaled in bearings 24 on the side of the hopper and the end of the shaft opposite the gear wheel 22 has a gear wheel 24' meshing with a gear wheel 25 which is journaled on a stud 26 on the end of the hopper.

The gear wheels 20 and 25 each have wrist pins 27 and 28 respectively, which engage bifurcated levers 29 and 30 respectively, pivoted on studs 31 and 32 respectively so that as the crank handle 19 is operated, the levers 30 oscillate for a purpose to be presently explained.

The rollers 11 and 12 are intermittently operated through the means of a ratchet wheel 33 which is secured on the end of a trunnion or journal of the roller 12 and the ratchet 34 which coöperates with the ratchet wheel is so arranged with relation to the ratchet wheel that it rotates the ratchet wheel in the direction of the arrow, Fig. 1, thus rotating the roller 12 and the roller 12 in turn communicating motion to the roller 11 for feeding the dough. The ratchet 34 is oscillated by means of a link 35 which has one end pivoted to the lever 30 and the said lever 30 has a slot 36 in which a screw 37 carried by the end of the link 35 is adjustable and the link is held at different positions of adjustment with relation to the lever 30 by means of the binding nut 38 threaded on the screw 37, so that by this adjustment, the throw of the ratchet can be increased or diminished to increase or diminish the action of the feeding rolls so that greater or less mass or quantity of dough may be fed during one cycle of operation of the device.

The hopper is secured to a base 39 by clamps 40, here shown as comprising I-bolts mounted on pivots 41 and said bolts extend through apertures 42 of a sill of the base and are secured by nuts 43, hence the hopper may be detachably connected to the base.

It is preferable that the base be mounted on wheels 44 so that it can be moved from place to place and the manner of accomplishing this is well shown in the drawing and need not, it is thought, be further described.

On the inner surface of the end plates 45 of the base, there is a track or guideway for a reciprocating cutter frame adapted to permit the said frame to reciprocate while at the same time communicating a vertical motion to the said frame and as these devices are duplicated on the two end plates, a description of one of said devices will suffice as a disclosure of the means having the functions stated.

A rail or track 46 is secured in any appropriate way to the inner face of one of said plates 45 and the said track has an end 47 extending upwardly on an incline so that the frame or a projection therefrom to be presently explained, will be caused to travel on the straight portion of the track and then to travel up the inclined portion to an elevated position, as compared with the position it occupied when on the straight portion of the said track. In spaced relation to the track 46 and situated thereabove, is a track section 48 which is comparatively short, but is adapted to carry a guide cutting frame at a certain stage of its travel and operation. One end of the track 48 is supplied with a switch 49 which is mounted on the pivot 50 of the track 48 and the said switch is held normally in engagement with the upper inclined surface of the portion 47 of the track, so that as the cutting frame is moved up the inclined surface, the switch will yield to permit passage of the frame or its extension and upon the passage thereof, the said switch will be returned into engagement with the inclined surface by means to be presently explained, and on return motion or movement of the frame, it will ride over the upper surface of the said switch and of the track section 48 to the end thereof. At the end of the track section 48 there is a spring 51 with a shoulder 52, the said shoulder bearing against the end of the track section 48 and the said spring has an extension 53 forming a cam which will guide the frame or the extension thereof to the end of the track section 48 and cause it to descend on to the track section 46 and on each reciprocation of the frame, the operation will be repeated. The spring 51 has its end anchored to the side of the plate by a screw 54 and its relation to the track sections is well illustrated in Fig. 5.

The cutter frame 55 has fingers 56 attached to it, the said fingers being slotted as at 57 to form seats for the wire 58 which constitutes the cutter, the said wire being reciprocated or moved under the dies so that the dough which is passed through the dies will be cut. The dies in the present embodiment of the invention have central cores 59 so that dough passing through the dies will have an aperture in its center after the fashion of the ordinary doughnut. The wire 58 is anchored at 60 to the frame and the opposite end thereof extends to a winding device 61 by which the tension of the wire may be regulated.

The frame 55 has lugs or journals 62 at its ends and arms 63 which constitute a part of the frame to which the cutting wire is attached have journals 64 which travel on the upper and lower tracks so as to bring the cutting wire into elevated position with relation to the dies and to permit it to travel in a lower plane on its return movement, it being obvious that the arms 63 are oscillatably mounted on that portion of the frame having the journals 62. The journals 62 are engaged by the bifurcated ends of the levers 29 and 30 so that as the levers oscillate, motion is communicated to the cutting frame so that the arms 63 will be caused to travel with relation to the track sections, heretofore described.

The pivot 50 extends through the side plate and an arm 50$^a$ is mounted on it, the said arm 50$^a$ being under tension of a spring 50$^b$, which spring pulls the said arm normally upward. The spring 50$^b$ is anchored to a screw 50$^c$ and the arm 50$^a$ has its movement limited by a screw 50$^d$ carried by the side plate. While I have referred to the elements 50$^c$ and 50$^d$ as screws, it is evident that any stud or stop may be employed in this connection.

From an inspection of the drawing and from the foregoing description, it will be apparent that when dough is placed in the hopper and the crank 19 is turned, motion will be communicated to the ratchet 33 through the gears and connections described and that on each oscillation of the lever, the ratchet wheel will be turned a predetermined degree depending upon the adjustment of the link 35 with relation to the lever 30 and this will control the feeding action of the rolls, so that a greater or less amount of dough will be forced through the dies.

During the oscillation of the levers 29 and 30, motion will also be communicated to the cutting frame through the instrumentalities heretofore described and the arms carrying the cutting wire will rise and fall during their travel thus bringing the wire cutter into operative relation to the dies on movement in one direction and carrying the said cutter wire past the dies on a lower plane in its movement in the opposite direction, so that the dough will be fed and cut by a continuous rotation of the crank handle, and the functions of the other portions of the apparatus will be performed to communicate motion to the several parts which coact to force the dough from the hopper and cut it.

Figure 7:
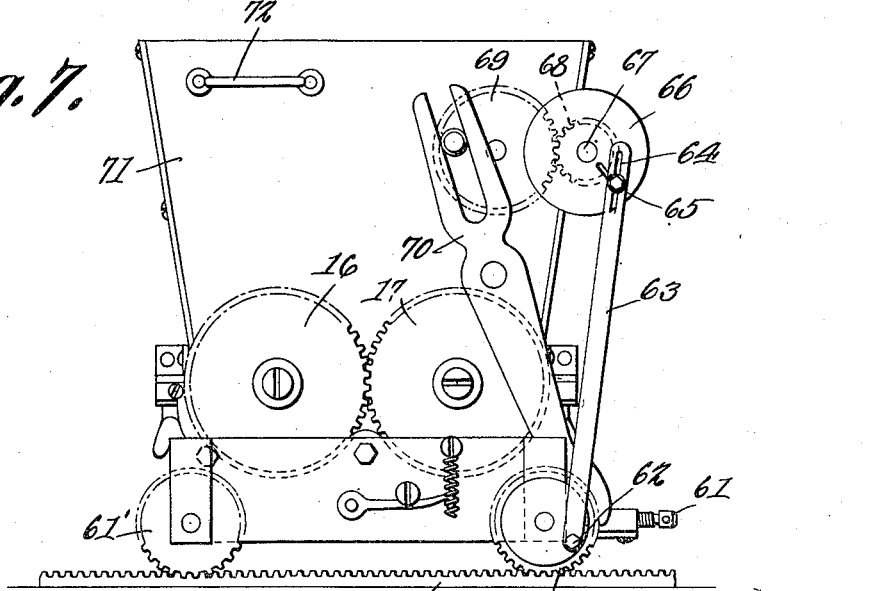
Fig. 7 illustrates an end elevation of a modified construction.

In the modification shown in Fig. 7, all of the parts of the apparatus are the same as described in connection with the disclosure of the invention shown in the other figures, the only difference being that the crank handle and the gear wheel rotated thereby is omitted and other means are supplied for operating the mechanism.

In carrying out the invention as embodied in the modification, a rack 60' is provided, which rack is engaged by toothed wheels 61' constituting the truck of the base so that as the truck is moved, the wheels 61' are rotated and one of said wheels may be termed a traction or driving wheel as it is provided with means whereby it rotates or drives the mechanism. One of the said wheels 61' has a wrist pin 62 to which a pitman 63 is pivoted, and the opposite end of the said pitman has a slot 64 to receive the wrist pin 65 on a wheel 66, the said wheel being mounted on a shaft 67 which shaft also carries a toothed wheel 68, the teeth of which mesh with a gear wheel 69, which operates a lever 70 similar to the lever 29 shown in other figures of the drawing. The hopper 71 of the modified form has a handle 72 which may be grasped for pushing the apparatus longitudinally of the rack and as it is moved along the track, the dough will be fed and cut. As the mechanism on the end of the machine opposite that shown in Fig. 7 corresponds exactly with the mechanism shown in Fig. 1 and as the construction and operation has been well illustrated and described, it is believed unnecessary to enlarge upon the specification, since the construction and operation will, it is thought, be understood by those skilled in the art.

Figure 2:
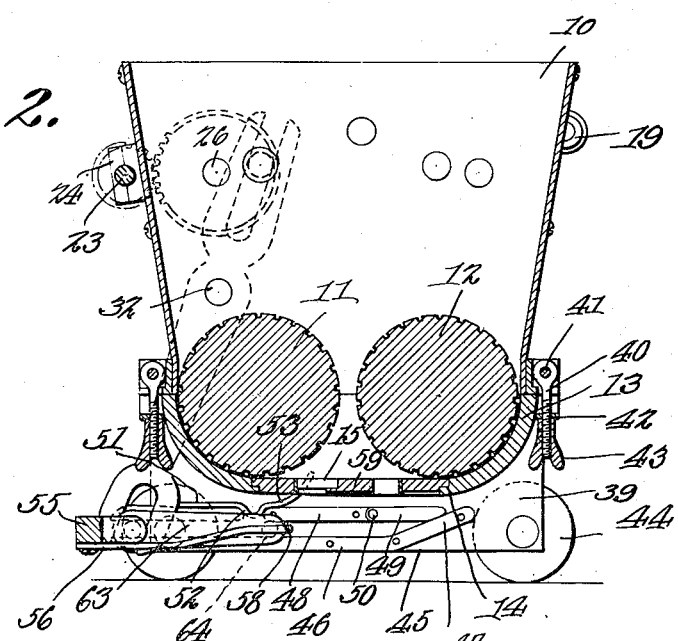
Fig. 2 illustrates a transverse sectional view.
Figure 3:
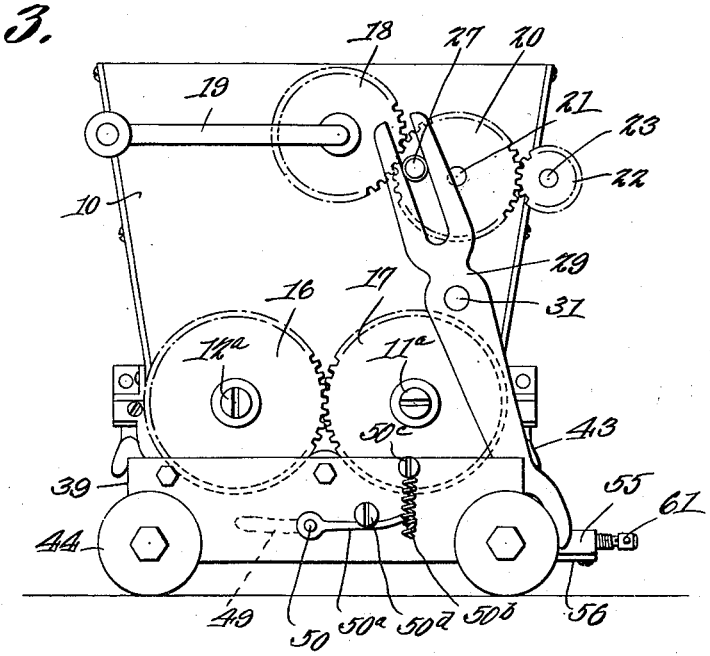
Fig. 3 illustrates a view in elevation of the end of the device opposite that shown in Fig. 1.
Figure 8:
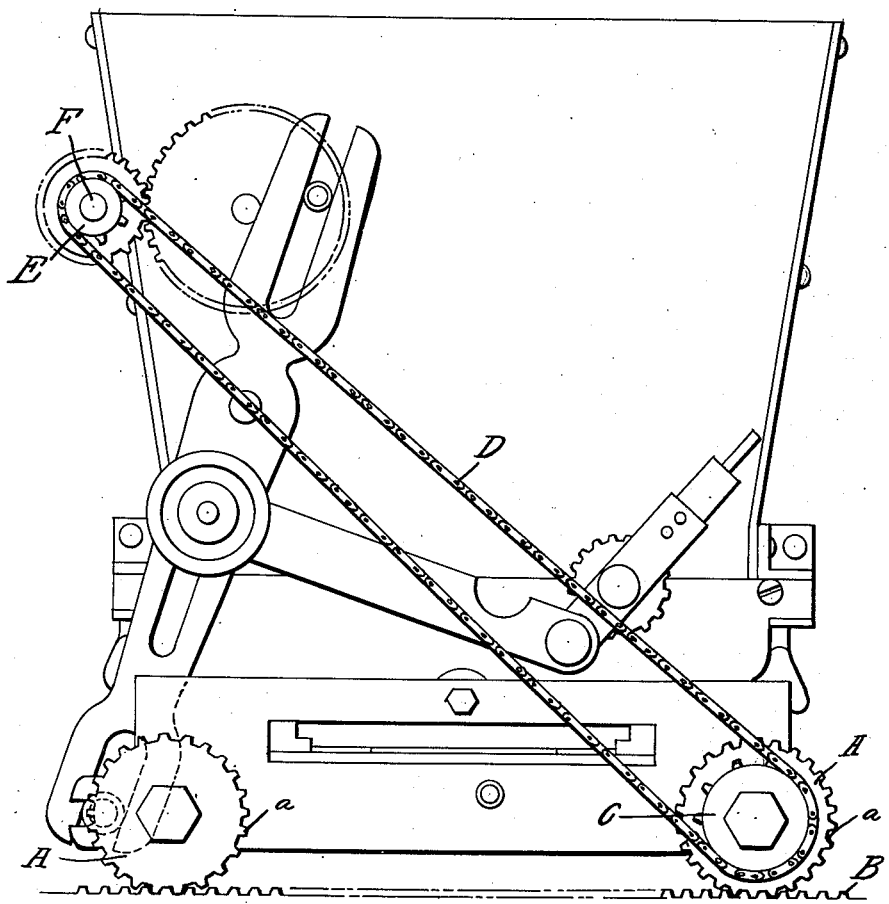
Fig. 8 illustrates a view in elevation of a dough cutter embodying a further modification.

In Fig. 8, the dough cutting mechanism will be substantially the same as that described heretofore, except that in utilizing the movement of the truck containing or carrying the mechanism for driving the said mechanism, I employ a sprocket chain and sprocket wheels instead of the other mechanical features for accomplishing this result as shown in the other figures of the drawing. In connection with the disclosure of the invention in Fig. 8, the traction wheels A are shown as having teeth a which run on tracks B, and thereafter when the truck is moved, the traction wheels are rotated. A sprocket wheel C is connected in any appropriate way to the traction wheel A and it may constitute a continuance of the face of the said wheel or it may be connected with it in any appropriate manner and the said sprocket wheel is engaged by a sprocket chain D which operates over a sprocket wheel E on a shaft F which shaft corresponds with the shaft 23 in the disclosure in Figs. 1 and 2, and the remainder of the mechanism will be substantially the same, as stated, except as to the manner of driving the said shaft.

Instead of having the dies of the configuration shown in the drawing, they, of course, may be varied in size or shape for cutting dough into fancy designs such as what are known as cooky dies which may be substituted for the doughnut dies. Furthermore, instead of having the wire cutter, a knife may be substituted for the wire when dough containing fruit or nuts is being molded.

I claim:

1. In a dough cutter, a hopper, feed rollers journaled therein, dies arranged in the lower portion thereof, a base for the hopper, a reciprocating cutter frame, superposed tracks carried by the sides of the base, inclined portions constituting continuations on the lower track, switches, means for returning the switches to their normal position, guides in operative relation to each upper track section adapted to be dislodged by the movement of the cutter frame so as to permit the frame to return to the lower tracks.

2. In a dough cutter, a hopper, feed rollers journaled therein, means for intermittently rotating the feed rollers, a base for the hopper, a reciprocating cutter frame, superposed tracks mounted on the sides of the base, extensions on the cutter frame engaging said tracks, an inclined portion on each lower track, switches for said upper track section, guide members having downwardly extending shoulders engaged by the cutter frame when moved in a backward direction, whereby the frame is arrested and forced to the lower track, and means carried by the hopper for reciprocating the cutter frame.

CHAS. M. WHEELER.